US012787120B2

(12) United States Patent
Kang et al.

(10) Patent No.: US 12,787,120 B2
(45) Date of Patent: Nov. 3, 2026

(54) INDUCTION HEATING APPARATUS

(71) Applicant: LG ELECTRONICS INC., Seoul (KR)

(72) Inventors: Kyelyong Kang, Seoul (KR); Jinwook Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 892 days.

(21) Appl. No.: 18/124,865

(22) Filed: Mar. 22, 2023

(65) Prior Publication Data

US 2024/0324069 A1 Sep. 26, 2024

(30) Foreign Application Priority Data

Mar. 25, 2022 (KR) ........................ 10-2022-0037319

(51) Int. Cl.
*H05B 1/02* (2006.01)
*H05B 6/04* (2006.01)
*H05B 6/06* (2006.01)

(52) U.S. Cl.
CPC ............. *H05B 1/0266* (2013.01); *H05B 6/04* (2013.01); *H05B 6/062* (2013.01)

(58) Field of Classification Search
CPC .... H05B 6/02–44; H05B 1/0266; H05B 6/04; H05B 6/062; H05B 6/1209
See application file for complete search history.

(56) References Cited

U.S. PATENT DOCUMENTS 4,317,975 A * 3/1982 Mizukawa .............. H02M 5/27 363/160
4,473,732 A * 9/1984 Payne .................... H05B 6/062 219/625
4,962,292 A * 10/1990 Aoki ...................... H05B 6/666 323/902
6,842,355 B2 * 1/2005 Kleveland ........... H02M 1/0043 363/97
10,333,428 B2 * 6/2019 Kondo ..................... H05B 6/10
2003/0179595 A1 * 9/2003 Kleveland ............. H02M 7/493 363/132

(Continued)

FOREIGN PATENT DOCUMENTS

KR 100218473 B1 * 9/1999 ............. H05B 6/062
KR 100239360 B1 * 1/2000 ............. H05B 6/062

(Continued)

*Primary Examiner* — Topaz L. Elliott
(74) *Attorney, Agent, or Firm* — Bryan Cave Leighton Paisner LLP

(57) ABSTRACT

An induction heating apparatus of one embodiment may comprise a rectifying circuit rectifying an AC voltage supplied from a power source, a smoothing circuit connecting to the rectifying circuit and smoothing a voltage output from the rectifying circuit, a first switching element having a first terminal that connects to a working coil, and a second terminal that connects to the smoothing circuit, a second switching element connecting to the first switching element in parallel, a driving circuit supplying a first switching signal to the first switching element and a second switching signal to the second switching element, and a controller outputting a first control signal corresponding to the first switching signal, and a second control signal corresponding to the second switching signal.

6 Claims, 5 Drawing Sheets

(56) References Cited

U.S. PATENT DOCUMENTS

| | | | | |
|---|---|---|---|---|
| 2006/0076338 | A1* | 4/2006 | Kagan | H05B 6/04<br>435/287.2 |
| 2015/0194883 | A1* | 7/2015 | Touzelbaev | H02M 1/4208<br>315/224 |
| 2017/0303345 | A1 | 10/2017 | Gelber et al. | |
| 2018/0375442 | A1* | 12/2018 | Kondo | H05B 6/10 |
| 2020/0281048 | A1* | 9/2020 | Kopiness | H05B 6/1209 |
| 2023/0422356 | A1* | 12/2023 | Kim | H05B 6/04 |

FOREIGN PATENT DOCUMENTS

| | | | | |
|---|---|---|---|---|
| KR | 100692634 | B1 * | 3/2007 | H05B 6/062 |
| KR | 102201065 | B1 * | 1/2021 | H05B 6/04 |
| WO | WO-2004107819 | A1 * | 12/2004 | H05B 6/062 |

* cited by examiner

INDUCTION HEATING APPARATUS

CROSS-REFERENCE TO RELATED APPLICATION

This application claims priority to and the benefit of Korean Patent Application No. 10-2022-0037319, filed on Mar. 25, 2022, the disclosure of which is incorporated herein by reference in its entirety.

TECHNICAL FIELD

Disclosed herein is an induction heating apparatus.

BACKGROUND

Induction heating apparatuses heat a container, based on an induction heating method. As electric energy is supplied to a working coil included in an induction heating apparatus, a magnetic field is formed around the working coil. The magnetic field generates eddy current in a container that is placed on the working coil, to heat the container.

An induction heating apparatus includes a switching element (e.g., an MOSFET element or an IGBT element) for supplying current to a working coil. A switching element is turned on and turned off repeatedly, based on a switching signal (e.g., a PWM signal). The repetitive turn-on and turn-off of the switching element can be referred to as a switching operation of the switching element, and the number of the repetitive switching operations of the switching element for unit time can be referred to as a switching frequency.

As the switching element performs a switching operation, electric energy is supplied to a working coil, and AC current flows in the working coil. The frequency of the AC current flowing in the working coil can be referred to as a resonance frequency.

As the resonance frequency of a working coil becomes higher, the working coil or another resonant component can become slim and lightweight. To increase the resonance frequency of the working coil, the switching frequency of a switching element needs to be high. However, due to the physical properties of the switching element, the switching frequency of the switching element cannot increase to a predetermined limiting value or greater. Accordingly, the resonance frequency of the working coil cannot increase to a predetermined limiting value or greater.

To solve the problem, research have been performed into the application of an element of a novel property, which can operate at a high switching frequency like a wide-band-gap (WBG) semiconductor element. However, in the case where a new element such as a WBG semiconductor element is applied, costs of manufacturing an induction heating apparatus increase, and reliable driving of the induction heating apparatus cannot be ensured due to low reliability of the element.

SUMMARY

The objective of the present disclosure is to provide an induction heating apparatus that increases a resonance frequency of a working coil with an ordinary switching element, thereby making a working coil or another resonance component slim and lightweight.

The objective of the present disclosure is to provide an induction heating apparatus that increases a resonance frequency of a working coil and ensures reliable driving of a working coil without causing an increase in manufacturing costs.

Aspects according to the present disclosure are not limited to the above ones, and other aspects and advantages that are not mentioned above can be clearly understood from the embodiments set forth herein. Additionally, the aspects and advantages in the present disclosure can be realized via components and combinations thereof that are described in the appended claims.

An induction heating apparatus of one embodiment may comprise a rectifying circuit rectifying an AC voltage that is supplied from a power source, a smoothing circuit connecting to the rectifying circuit and smoothing a voltage that is output from the rectifying circuit, a first switching element having a first terminal that connects to a working coil and a second terminal that connects to the smoothing circuit, a second switching element connecting to the first switching element in parallel, a driving circuit supplying a first switching signal to the first switching element and a second switching signal to the second switching element, and a controller outputting a first control signal corresponding to the first switching signal and a second control signal corresponding to the second switching signal.

In one embodiment, a rising edge timing of the first switching signal and a rising edge timing of the second switching signal may synchronize with a zero-crossing point of an on voltage of the first switching element, or a zero-crossing point of an on voltage of the second switching element.

In one embodiment, the rising edge timing of the first switching signal and the rising edge timing of the second switching signal may synchronize with a zero-crossing point at a time when the on voltage of the first switching element changes from a positive number to a negative number, or a zero-crossing point at a time when the on voltage of the second switching element changes from a positive number to a negative number.

In one embodiment, a driving frequency of the working coil may be twice a switching frequency of the first switching element or a switching frequency of the second control signal.

In one embodiment, the switching frequency of the first switching element may be the same as a switching frequency of the second switching element.

In one embodiment, the first switching element and the second switching element may be turned on and turned off alternately. The first switching element may be turned on after predetermined first time passes from a timing at which the second switching element is turned off, and the second switching element may be turned on after predetermined second time passes from a timing at which the first switching elements is turned off.

In one embodiment, the rising edge timing of the first switching signal may be a time point at which predetermined third time passes from the rising edge timing of the second switching signal, and the rising edge timing of the second switching signal may be a time point at which predetermined fourth time passes from the rising edge timing of the first switching signal.

Although an ordinary switching element is used for an induction heating apparatus of one embodiment, a resonance frequency of the working coil increases further, thereby making a working coil or another resonant component slim and lightweight.

The induction heating apparatus of one embodiment ensures in increase in the resonance frequency of a working coil and reliable driving of the induction heating apparatus, without causing an increase in the costs of manufacturing the induction heating apparatus.

BRIEF DESCRIPTION OF DRA WINGS

DETAILED DESCRIPTION

Figure 1:
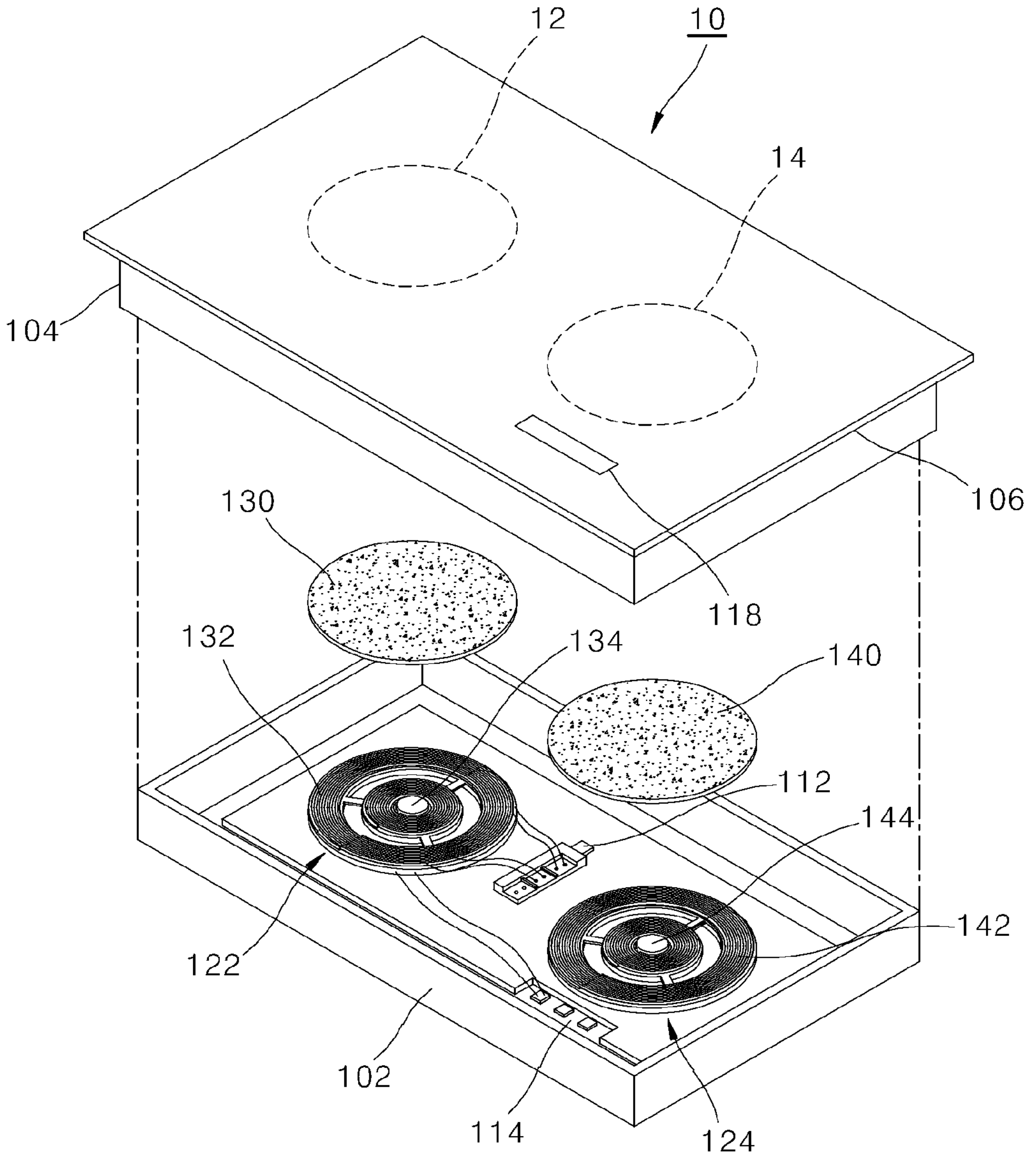
FIG. 1 is an exploded perspective view showing an induction heating apparatus of one embodiment.

The above-described aspects, features and advantages are specifically described hereafter with reference to accompanying drawings such that one having ordinary skill in the art to which the present disclosure pertains can embody the embodiments of the disclosure easily. In the disclosure, detailed description of known technologies in relation to the subject matter of the disclosure is omitted if it is deemed to make the gist of the disclosure unnecessarily vague. Hereafter, preferred embodiments according to the disclosure are specifically described with reference to the accompanying drawings. In the drawings, identical reference numerals can indicate identical or similar components.

FIG. 1 is an exploded perspective view showing an induction heating apparatus of one embodiment.

The induction heating apparatus 10 of one embodiment comprises a case 102 constituting the main body of the induction heating apparatus 10, and a cover plate 104 being coupled to the case 102 and sealing the case 102.

The cover plate 104 seals a space, which is formed in the case 102 as the cover plate 104 is coupled to the upper surface of the case 102, from the outside. The cover plate 104 comprises an upper plate 106 on which a container for cooking a food item may be placed. In one embodiment, the upper plate 106 may be made of tempered glass such as ceramic glass. However, the material for the upper plate 106 may vary depending on embodiments.

A first heating zone 12 and a second heating zone 14 respectively corresponding to working coil assemblies 122, 124 are formed on the upper plate 106. For the user to recognize the positions of the heating zones 12, 14 clearly, lines or figures corresponding to the heating zones 12, 14 may be printed or marked on the upper plate 106.

The case 102 may be formed into a cuboid the upper portion of which is open. The working coil assemblies 122, 124 for heating a container are disposed in the space formed in the case 102. Additionally, an interface part (or an interface) 114 is provided in the case 102, and performs the function of allowing the user to supply power or to adjust a power level of each heating zone 12, 14 and the function of displaying information on the induction heating apparatus 10. The interface part 114 may be a touch panel that enables a touch-based input of information and a display of information, but depending on embodiments, the interface part 114 may be embodied as another device or another structure.

Additionally, a manipulation zone 118 is formed on the upper plate 106 and disposed in a position corresponding to the position of the interface part 114. For the user's manipulation, characters or images and the like may be printed in advance, in the manipulation zone 118. The user may touch a specific point of the manipulation zone 118 with reference to the characters or images printed in advance in the manipulation zone 118, to perform a desired manipulation. Further, information output by the interface part 114 may be displayed through the manipulation zone 118.

The user may set a power level of each of the heating zones 12, 14 through the interface part 114. For example, power levels may be expressed as numbers (e.g., 1, 2, 3, . . . , 9), on the manipulation zone 118. As a power level of each of the heating zones 12, 14 is set, a required power value and a heating frequency of a working coil corresponding to each of the heating zones 12, 14 are determined. A controller may drive each of the working coils, based on the determined heating frequency, such that an actual output power value of each of the working coils matches the required power value set by the user.

A power supply device 112 may be disposed in the space of the case 102, and supply power to a first working coil assembly 122, a second working coil assembly 124, and the interface part 114.

In FIG. 1, two working coil assemblies, i.e., the first working coil assembly 122 and the second working coil assembly 124 are disposed in the case 102, for example. However, in another embodiment, three or more working coil assemblies may be disposed in the case 102.

The working coil assemblies 122, 124 may comprise a working coil that forms an induction field by using high-frequency AC current which is supplied by the power supply device 112, and a thermal insulation sheet that protects the coil from heat which is generated by a container. For example, in FIG. 1, the first working coil assembly 122 comprises a first working coil 132 for heating a container that is placed in the first heating zone 12, and a first thermal insulation sheet 130, and the second working coil assembly 124 comprises a second working coil 142 for heating a container that is placed in the second heating zone 14, and a second thermal insulation sheet 140. Depending on embodiments, the thermal insulation sheet may not be disposed.

Further, a temperature sensor is disposed at the center of each of the working coils 132, 142. For example, in FIG. 1, a temperature sensor 134 is disposed at the center of the first working coil 134, and a second temperature sensor 144 is disposed at the center of the second working coil 142. A sensing value based on the temperature sensor's sensing of temperature may be delivered to the controller, and the controller may obtain a temperature value, based on the sensing value. In one embodiment, the temperature sensor may be a thermistor having variable resistance at which a resistance value changes depending on the temperature of a container, but not limited.

In one embodiment, the temperature sensor outputs a sensing voltage corresponding to the temperature of a container, and the sensing voltage that is output from the temperature sensor is delivered to the controller. The controller may check the temperature of the container, based on the magnitude of the sensing voltage output from the temperature sensor, and when the temperature value or a rate of a change in the temperature of the container is a predetermined reference value or greater, may perform an overheating prevention operation of decreasing the output power value of a working coil or stopping the driving of the working coil.

Though not illustrated in FIG. 1, a circuit board, on which a plurality of circuits or elements comprising the controller is mount, may be disposed in the space formed in the case 102.

The controller may drive each of the working coils 132, 142 according to the user's instruction to start heating, input through the interface part 114, to perform a heating operation. As the user inputs an instruction to end heating through the interface part 114, the controller may stop the driving of the working coil 132, 142 to end the heating operation.

Figure 2:
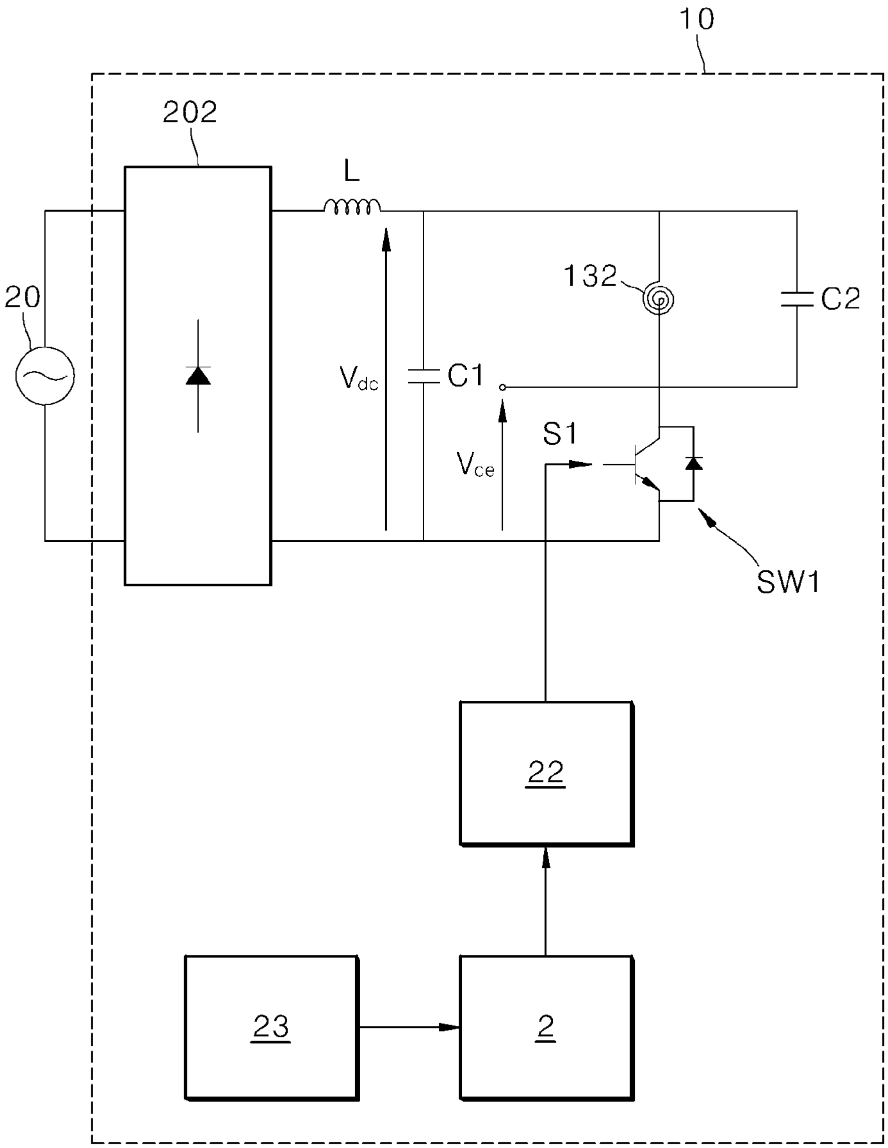
FIG. 2 is a block diagram of the induction heating apparatus of one embodiment.

FIG. 2 is a block diagram of the induction heating apparatus of one embodiment.

The induction heating apparatus 10 of one embodiment comprises a rectifying circuit 202, a smoothing circuit L, C1, a switching element (or switch) SW1, a working coil 132, a second capacitor C2, a controller 2, and a driving circuit 22.

The rectifying circuit 202 rectifies an AC input voltage that is supplied from the power supply device 20, and output a voltage that has pulse waveforms. The rectifying circuit 202 may comprise a plurality of diode elements. A bridge diode circuit may be an example of the rectifying circuit 202, but the sort of rectifying circuit 202 may not be limited.

The smoothing circuit L1, C1 smoothes the voltage rectified by the rectifying circuit 32 and outputs a DC voltage. The smoothing circuit L, C1 comprises an inductor L and a first capacitor (or a DC link capacitor) C1. A voltage, which is supplied to both ends of the DC link capacitor C1 as the current is supplied to the working coil 132, is referred to as a DC link voltage Vdc.

The working coil 132 and the switching element SW1 connect to each other in series. The working coil 132 and the switching element SW1 connect to the DC link capacitor C1 in parallel. The second capacitor C2 connects to the working coil 132 in parallel.

The switching element SW1 is turned on and turned off by a switching signal S1 repeatedly. The switching signal S1 may be supplied from the driving circuit 22. The repetitive turn-on and turn-off of the switching element SW1 may be referred to as a switching operation of the switching element SW1, and the number of the repetitive switching operations of the switching element SW1 for unit time may be referred to as a switching frequency.

As the switching operation of the switching element SW1 is performed, electric energy is supplied to the working coil 132, and AC current flows in the working coil 132. The frequency of the AC current flowing in the working coil 132 may be referred to as a resonance frequency.

As the switching element SW1 performs a switching operation, based on the switching signal S1, a voltage Vce that is supplied between a first terminal (e.g., a collector) and a second terminal (e.g., an emitter) is referred to as an on voltage of the switching element SW1.

The controller 2 outputs a control signal for controlling the switching operation of the switching element SW1. In one embodiment, the control signal may be a pulse width modulation signal having pulse waveforms, but the sort of control signal is not limited.

In one embodiment, the controller 2 may determine a required power value and a heating frequency of the working coil 132, corresponding to a power level set by the user. The controller 2 may output a control signal such that an actual output power value of the working coil 132 matches the required power value, based on the heating frequency. The controller 2 may adjust the switching frequency or the duty ratio of the switching signal S1, based on the required power value.

The driving circuit 22 outputs a switching signal S1 for the switching operation of the switching element SW1, based on the control signal that is supplied from the controller 2. In one embodiment, the switching signal S1 may be a PWM signal having pulse waveforms, but the sort of switching signal S1 is not limited.

In one embodiment, the induction heating apparatus 10 may further comprise a timer 23. In one embodiment, the timer 23 may output a timing signal that synchronizes with a zero-crossing point of the on voltage of the switching element SW1. The controller 2 may output a control signal, based on the timing signal output from the timer 23.

Figure 3:
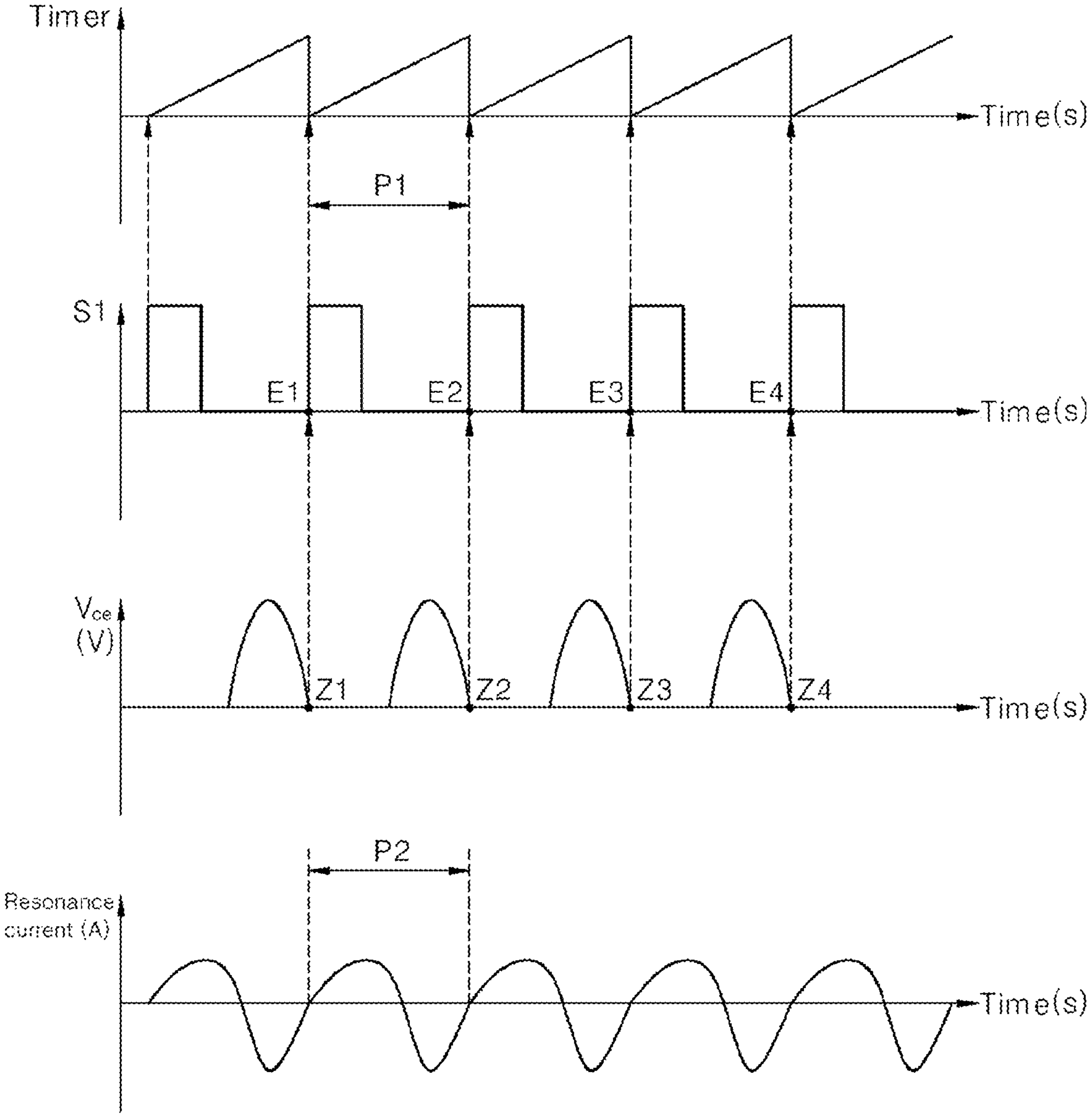
FIG. 3 is a graph showing the waveforms of a switching signal that is supplied to a switching element, an on voltage of a switching element, and a resonance current of a working coil in one embodiment.

FIG. 3 is a graph showing the waveforms of a switching signal that is supplied to a switching element, an on voltage of a switching element, and a resonance current of a working coil in one embodiment.

As the user inputs a power level and then the operation of heating a container starts, the controller 2 outputs a control signal corresponding to a required power value of the working coil 132. The driving circuit 22 outputs a switching signal S1, based on the control signal that is supplied from the controller 2. As the switching signal S1 is input to a third terminal (e.g., a base), the switching element SW1 performs a switching operation. For example, when the switching signal S1 is at a high level, the switching element SW1 may be turned on, and when the switching signal S1 is at a low level, the switching element SW1 may be turned off.

When a first switching signal S1 is input, the switching operation of the switching element SW1 starts. Accordingly, when the switching element SW1 is turned on and turned off, an on voltage Vce is supplied between the first terminal and the second terminal of the switching element SW1.

Then the controller 2 outputs a control signal such that a rising edge timing E1, E2, E3, E4, . . . of other switching signals S1/another switching signal S1, output after the first switching signal S1, synchronizes with a zero-crossing point Z1, Z2, Z3, Z4, . . . of the on voltage Vce of the switching element SW1. In one embodiment, the rising edge timing E1, E2, E3, E4, . . . of each switching signal S1 may synchronize with each zero-crossing point Z1, Z2, Z3, Z4, . . . at a time when the on voltage Vce of the switching element SW1 changes a positive number (or a positive voltage) to a negative number (or a negative voltage). A falling edge timing of each switching signal S1 may be set differently depending on the required power value of the working coil 132.

In one embodiment, the controller 2 may output a control signal, based on a timing signal Timer that is output from the timer 23. Time corresponding to one cycle of the timing signal Timer that is output from the timer 23 may be set to synchronize with the zero-crossing point Z1, Z2, Z3, Z4, . . . of the on voltage Vce of the switching element SW1. Accordingly, the controller 2 synchronizes the timing signal Timer with the rising edge timing E1, E2, E3, E4, . . . of the switching signal S1, such that the rising edge timing E1, E2, E3, E4, . . . of the switching signal S1 synchronizes with the zero-crossing point Z1, Z2, Z3, Z4, . . . of the on voltage Vce of the switching element SW1.

In a control method of FIG. 3, a cycle P2 of resonance current flowing in the working coil 132 is same as a cycle P1 of the switching signal S1. That is, the resonance current 1/P2 of the working coil 132 is same as the switching frequency 1/P1 of the switching element SW1. Since the resonance frequency of the working coil 132 of the induction heating apparatus 10 comprising the circuit that is illustrated in FIG. 2 is same as the switching frequency of the switching element SW1, the resonance frequency of the working coil 132 of the induction heating apparatus 10 comprising the circuit that is illustrated in FIG. 2 may increase to a limiting value of the frequency of the switching element SW1, or greater. For example, in the case where the limiting value of the frequency of the switching element SW1 is 80 kHz in FIG. 2, the resonance frequency of the working coil 132 cannot be greater than 80 kHz.

Figure 4:
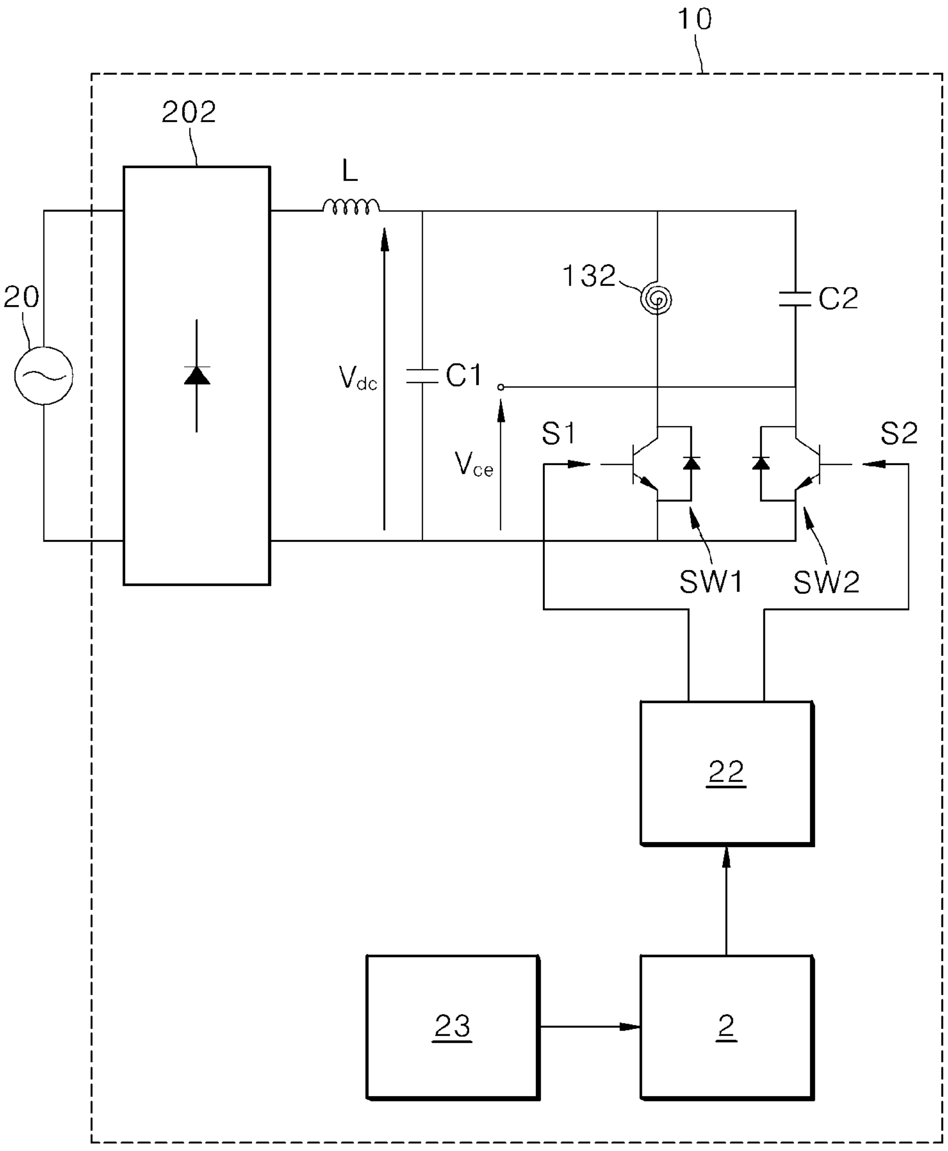
FIG. 4 is a block diagram of an induction heating apparatus of another embodiment.

FIG. 4 is a block diagram of an induction heating apparatus of another embodiment.

An induction heating apparatus 10 of another embodiment comprises a rectifying circuit 202, a smoothing circuit L, C1, a first switching element (or a first switch) SW1, a second switching element (or a second switch) SW2, a working coil 132, a second capacitor C2, a controller 2, and a driving circuit 22.

The rectifying circuit 202 rectifies an AC input voltage that is supplied from a power supply device 20, and output a voltage that has pulse waveforms. The rectifying circuit 202 may comprise a plurality of diode elements. A bridge diode circuit may be an example of the rectifying circuit 202, but the sort of rectifying circuit 202 may not be limited.

The smoothing circuit L1, C1 smoothes the voltage rectified by the rectifying circuit 32 and outputs a DC voltage. The smoothing circuit L, C1 comprises an inductor L and a first capacitor (or a DC link capacitor) C1. A voltage, which is supplied to both ends of the DC link capacitor C1 as the current is supplied to the working coil 132, is referred to as a DC link voltage Vdc.

The working coil 132 and the first switching element SW1 connect to each other in series. The working coil 132 and the first switching element SW1 connect to the DC link capacitor C1 in parallel. The second switching element SW2 connects to the first switching element SW2 in parallel. The second capacitor C2 connects to the working coil 132 in parallel.

The first switching element SW1 is turned on and turned off by a first switching signal S1 repeatedly. The second switching element SW2 is turned on and turned off by a second switching signal S2 repeatedly. The first switching signal S1 and the second switching signal S2 may be supplied from the driving circuit 22. The repetitive turn-on and turn-off each of the first switching element SW1 and the second switching element SW2 may be referred to as a switching operation of the first switching element SW1 and the second witching element SW2, and the number of the repetitive switching operations of the first switching element SW1 and the second witching element SW2 for unit time may be referred to as a switching frequency.

As the switching operations of the first switching element SW1 and the second witching element SW2 are performed, electric energy is supplied to the working coil 132, and AC current flows in the working coil 132. The frequency of the AC current flowing in the working coil 132 may be referred to as a resonance frequency.

As the first switching element SW1 performs a switching operation, based on the first switching signal S1, a voltage Vce that is supplied between a first terminal (e.g., a collector) and a second terminal (e.g., an emitter) of the first switching element SW1 is referred to as an on voltage of the first switching element SW1. As the second switching element SW2 performs a switching operation, based on the second switching signal S2, a voltage Vce that is supplied between a first terminal (e.g., a collector) and a second terminal (e.g., an emitter) of the second switching element SW2 is referred to as an on voltage of the second switching element SW1. The on voltage of the first switching element SW1 and the on voltage of the second switching element SW2 may be identical.

The controller 2 outputs a control signal respectively for controlling the switching operation of the first switching element SW1 and the second switching element SW2. In one embodiment, the control signal may be a pulse width modulation signal having pulse waveforms, but the sort of control signal is not limited.

In one embodiment, the controller 2 may determine a required power value and a heating frequency of the working coil 132, corresponding to a power level set by the user. The controller 2 may output a control signal such that an actual output power value of the working coil 132 matches the required power value, based on the heating frequency. The controller 2 may adjust the switching frequency of the first switching signal S1 and the second switching signal S2 or the duty ratio of the first switching signal S1 and the second switching signal S2, based on the required power value.

The driving circuit 22 outputs a first switching signal S1 and a second switching signal S2 respectively for the switching operations of the first switching element SW1 and the second switching element SW2, based on the control signal that is supplied from the controller 2. In one embodiment, the first switching signal S1 and the second switching signal S2 may be a PWM signal having pulse waveforms, but the sort of first switching signal S1 and second switching signal S2 is not limited.

In one embodiment, the induction heating apparatus 10 may further comprise a timer 23. In one embodiment, the timer 23 may output a timing signal that synchronizes with a zero-crossing point of the on voltage of the first switching element SW1 or a zero-crossing point of the on voltage of the second switching element SW2. The controller 2 may output a control signal, based on the timing signal output from the timer 23.

Figure 5:
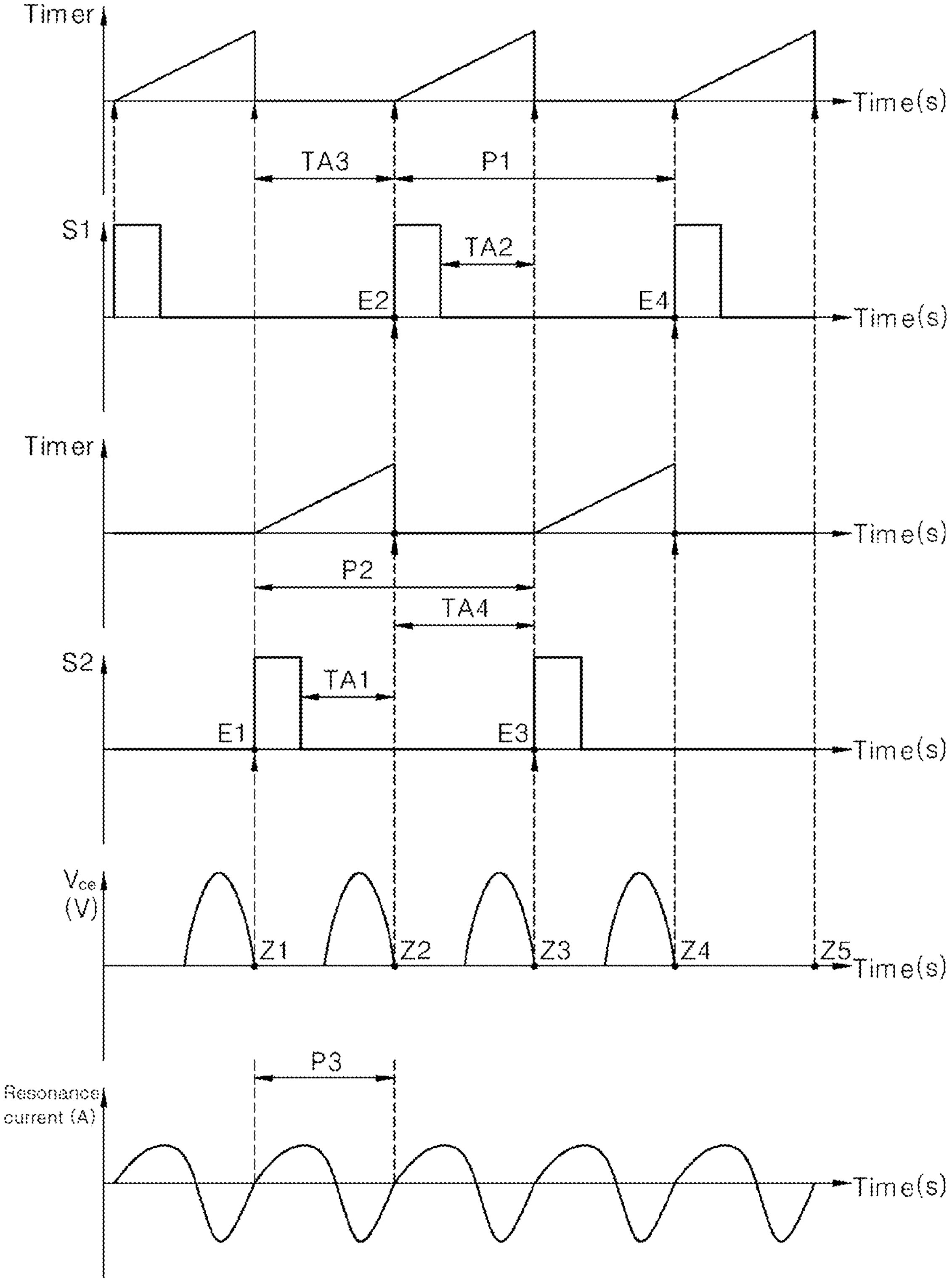
FIG. 5 is a graph showing the waveforms of a switching signal that is supplied to a switching element, an on voltage of a switching element, and a resonance current of a working coil in another embodiment.

FIG. 5 is a graph showing the waveforms of a switching signal that is supplied to a switching element, an on voltage of a switching element, and a resonance current of a working coil in another embodiment.

As the user inputs a power level and then an operation of heating a container starts, the controller 2 outputs a control signal corresponding to a required power value of the working coil 132. The driving circuit 22 outputs a first switching signal S1, based on the control signal that is supplied from the controller 2. As the first switching signal S1 is input to a third terminal (e.g., a base) of the first switching element SW1, the first switching element SW1 performs a switching operation. For example, when the first switching signal S1 is at a high level, the first switching element SW1 may be turned on, and when the first switching signal S1 is at a low level, the first switching element SW1 may be turned off.

As the first switching signal S1 is input, the switching operation of the first switching element SW1 starts. Accordingly, as the first switching element SW1 is turned on and turned off, an on voltage Vce is supplied between the first terminal and the second terminal of the first switching element SW1. FIG. 5 shows the on voltage Vce of the first switching element SW1. However, the on voltage of the second switching element SW2 may be the same as the on voltage Vce of the first switching element SW1.

Then the controller 2 supplies a control signal to the driving circuit 22, such that a first second switching signal S2 is output. The controller 2 outputs a control signal to synchronize each of the rising edge timing E1, E3, . . . of the second switching signal S2 with the zero-crossing point Z1, Z3, . . . of the on voltage Vce of the first switching element SW1 or the second switching element SW2.

Additionally, the controller outputs a control signal to synchronize the rising edge timing E2, E4, . . . of another first switching signal S1 that is output following the first first switching signal S1 with the zero-crossing point Z2, Z4, . . . of the on voltage Vce of the first switching element SW1 or the second switching element SW2.

In one embodiment, the rising edge timing E1, E2, E3, E4, . . . of each switching signal S1, S2 may synchronize with each zero-crossing point Z1, Z2, Z3, Z4, . . . at a time when the on voltage Vce of the first switching element SW1 or the second switching element SW2 changes from a positive number (or a positive voltage) to a negative number (or a negative voltage). A falling edge timing of each switching signal S1, S2 may be set differently depending on the required power value of the working coil 132.

In one embodiment, the controller 2 may output a control signal, based on a timing signal Timer that is output from the timer 23. Time corresponding to one cycle of the timing signal Timer that is output from the timer 23 may be set to synchronize with the zero-crossing point Z1, Z2, Z3, Z4, . . . of the on voltage Vce of the first switching element SW1 or the second switching element SW2. Accordingly, the controller 2 synchronizes the timing signal Timer with the rising edge timing E1, E2, E3, E4, . . . of each switching signal S1, S2, such that the rising edge timing E1, E2, E3, E4, . . . of each switching signal S1, S2 synchronizes with the zero-crossing point Z1, Z2, Z3, Z4, . . . of the on voltage Vce of the first switching element SW1 or the second switching element SW2.

In a control method of FIG. 5, the first switching element SW1 and the second switching element SW2 are turned on and turned off alternately. In one embodiment, the first switching element SW1 may be turned on after predetermined first time TA1 passes from a timing at which the second switching element SW2 is turned off (the falling edge timing of the second switching signal S2). In one embodiment, the second switching element SW2 may be turned on after predetermined second time TA2 passes from a timing at which the first switching element SW1 is turned off (the falling edge timing of the first switching signal S1). In one embodiment, as the first switching element SW1 and the second switching element SW2 are turned on and turned off alternately, there can be a section TA1, TA2 in which the first switching element SW1 and the second switching element SW2 are both turned off.

In one embodiment, the rising edge timing of the first switching signal S1 may be a time point at which predetermined third time TA3 passes from the rising edge timing of the second switching signal S2. In one embodiment, the rising edge timing of the second switching signal S2 may be a time point at which predetermined fourth time TA4 passes from the rising edge timing of the first switching signal S1.

In the control method of FIG. 5, the cycle P3 of resonance current flowing in the working coil 132 accounts for half the cycle P1 of the first switching signal S1 or half the cycle P2 of the second switching signal S2. That is, the resonance frequency 1/P3 of the working coil 132 is twice the switching frequency 1/P1 of the first switching element SW1 or twice the switching frequency 1/P2 of the second switching element SW2. Further, since the cycle P1 of the first switching signal S1 and the cycle P2 of the second switching signal S2 are identical, the switching frequency 1/P1 of the first switching element SW1 and the switching frequency 1/P2 of the second switching element SW2 are identical.

Accordingly, the resonance frequency of the working coil 132 of the induction heating apparatus 10 comprising the circuit that is illustrated in FIG. 4 may increase to a limiting value of the frequency of the first switching element SW1 or the second switching element SW2, or greater. For example, when the limiting value of the frequency of each of the first switching element SW1 and the second switching element SW2 is 80 kHz, in FIG. 4, the resonance frequency of the working coil 132 may be up to 160 kHz, in theory.

In the embodiment of FIGS. 4 and 5, the resonance frequency of a working coil may increase further, with an ordinary switching element. Thus, a working coil having novel properties or another resonant component may become slim and lightweight.

In the embodiment of FIGS. 4 and 5, a higher resonance frequency of a working coil, and reliable driving of an induction heating apparatus may be ensured without causing an increase in the costs of manufacturing the induction heating apparatus.

The embodiments are described above with reference to a number of illustrative embodiments thereof. However, embodiments are not limited to the embodiments and drawings set forth herein, and numerous other modifications and embodiments can be drawn by one skilled in the art. Further, the effects and predictable effects based on the configurations in the disclosure are to be included within the range of the disclosure though not explicitly described in the description of the embodiments.

What is claimed is:

1. An induction heating apparatus, comprising:

a rectifying circuit that rectifies an alternating current (AC) voltage;

a smoothing circuit that connects to the rectifying circuit and that smooths a voltage that is output from the rectifying circuit;

a first switch having a first terminal that connects to a working coil, and a second terminal that connects to the smoothing circuit;

a second switch that connects to the first switch in parallel;

a driving circuit that supplies a first switching signal to the first switch, and a second switching signal to the second switch; and a controller configured to output a first control signal corresponding to the first switching signal, and a second control signal corresponding to the second switching signal based on a timing signal output from a timer, wherein a rising edge timing of the first switching signal is synchronized with a zero-crossing point of an on voltage of the first switch, and a rising edge timing of the second switching signal is synchronized with an output timing of the timing signal, and wherein the output timing of the timing signal is synchronized with a zero-crossing point of the on voltage of the first switch or an on-voltage of the second switch.

2. The induction heating apparatus of claim 1, wherein the rising edge timing of the first switching signal is synchronized with the zero-crossing point of the on voltage of the first switch, which is a time point when the on voltage of the first switch changes from a positive voltage to zero, and the rising edge timing of the second switching signal is synchronized with the zero-crossing point of the on voltage of the second switch, which is a time point when the on voltage of the second switch changes from a positive voltage to zero.

3. The induction heating apparatus of claim 1, wherein a resonance frequency of the working coil is twice a switching frequency of the first switch or a switching frequency of the second switch.

4. P The induction heating apparatus of claim 1, wherein a switching frequency of the first switch is same as a switching frequency of the second switch.

5. The induction heating apparatus of claim 1, wherein the controller is configured to turn on and turn off the first switch and the second switch alternately, the first switch is turned on after a predetermined first time passes from a time point at which the second switch is turned off, and the second switch is turned on after a predetermined second time passes from a time point at which the first switch is turned off.

6. The induction heating apparatus of claim 1, wherein the rising edge timing of the first switching signal is a time point at which a predetermined third time passes from the rising edge timing of the second switching signal, and the rising edge timing of the second switching signal is a time point at which a predetermined fourth time passes from the rising edge timing of the first switching signal.

* * * * *